(12) United States Patent
Nachenberg

(10) Patent No.: US 7,647,362 B1
(45) Date of Patent: Jan. 12, 2010

(54) CONTENT-BASED FILE VERSIONING

(75) Inventor: Carey Stover Nachenberg, Northbridge, CA (US)

(73) Assignee: Symantec Corporation, Mountain View, CA (US)

( * ) Notice: Subject to any disclaimer, the term of this patent is extended or adjusted under 35 U.S.C. 154(b) by 444 days.

(21) Appl. No.: 11/288,587

(22) Filed: Nov. 29, 2005

(51) Int. Cl.
*G06F 12/00* (2006.01)
*G06F 17/30* (2006.01)

(52) U.S. Cl. .................................. 707/203; 707/204
(58) Field of Classification Search .................. None
See application file for complete search history.

(56) References Cited

U.S. PATENT DOCUMENTS

| | | | |
|---|---|---|---|
| 5,047,918 A * | 9/1991 | Schwartz et al. | 707/203 |
| 5,572,709 A | 11/1996 | Fowler et al. | |
| 5,758,566 A * | 6/1998 | Jepsen et al. | 92/187 |
| 5,893,119 A * | 4/1999 | Squibb | 707/203 |
| 6,049,663 A * | 4/2000 | Harikrishnan et al. | 703/23 |
| 6,058,400 A * | 5/2000 | Slaughter | 707/201 |
| 6,460,055 B1 * | 10/2002 | Midgley et al. | 707/204 |
| 6,704,755 B2 | 3/2004 | Midgley et al. | |
| 6,947,956 B2 | 9/2005 | Olstad et al. | |
| 7,124,305 B2 * | 10/2006 | Margolus et al. | 713/193 |
| 7,173,929 B1 | 2/2007 | Testardi | |
| 7,260,564 B1 * | 8/2007 | Lynn et al. | 707/3 |
| 2003/0061456 A1 | 3/2003 | Ofek et al. | |
| 2005/0071390 A1 * | 3/2005 | Midgley et al. | 707/204 |
| 2005/0193031 A1 * | 9/2005 | Midgley et al. | 707/200 |
| 2005/0210041 A1 | 9/2005 | Taguchi | |

OTHER PUBLICATIONS

Non-Final Office Action received in U.S. Appl. No. 11/289,148; Nov. 26, 2007.
Final Office Action received in U.S. Appl. No. 11/289,148; May 29, 2008.
Non-Final Office Action received in U.S. Appl. No. 11/289,148; Oct. 28, 2008.
Final Office Action received in U.S. Appl. No. 11/289,148; Apr. 1, 2009.
Non-Final Office Action received in U.S. Appl. No. 11/289,148; Aug. 18, 2009.

* cited by examiner

*Primary Examiner*—Charles Rones
*Assistant Examiner*—Daniel Kuddus
(74) *Attorney, Agent, or Firm*—Advantedge Law Group

(57) ABSTRACT

Mechanisms for saving and accessing versions of files using indexed content, rather than a system version identifier. Thus, a user may identify a version of a file by its content, rather than using a less descriptive system-assigned version identifier. Accordingly, the user is provided with a more intuitive and therefore efficient mechanism for identifying and accessing different versions of files.

13 Claims, 3 Drawing Sheets

CONTENT-BASED FILE VERSIONING

BACKGROUND OF THE INVENTION

Businesses, residences, and other enterprises have come to rely on computing systems to access, generate and manage their key files, documents, and other operational data. Often, the data itself is many times more valuable to an enterprise or individual than the computing hardware that stores the data. Accordingly, in this information age, many enterprises and individuals have taken precautions to protect their data.

One way of protecting data is to introduce storage redundancy. For example, a primary computing system maintains and operates upon the active data. Meanwhile, a backup computing system maintains a copy of the data. This may be accomplished by periodically taking a snapshot of the active data as that active data existed at the time of the snapshot, and by providing the snapshot copy of the protected data to a backup location on a periodic basis. For instance, snapshot-based backups often are configured to occur on a daily basis, though more or less frequent backup periods are also common. Should the active data be lost, the most recent backup copy of the data may be restored, thereby recovering the active data as the active data existed at the time of the last backup.

In some instances, however, it may be highly undesirable to lose all of the changes to the data that occurred since the time of the last snapshot backup. In such cases, Continuous Data Protection CDP may be more desirable. In CDP-based backup systems, an initial copy of the live data to be protected is captured and transferred to a backup medium. All subsequent writes to the live data are then time-stamped and journaled to the backup medium after each write operation. For instance, whenever a write operation occurs, the time, content, and target location of the write operation are documented in a data structure, which is then provided to the backup medium.

Whether snapshot-based or CDP-based, backup systems are often employed to save various versions of files. Even outside of the backup environment, various file versions may be stored locally. When identifying a desired version of a file for later access, the user is typically left to use the version identification mechanism assigned by the system. A typical system-assigned versioning mechanism may simply assign a version number to the document. The version number would begin with "version 1" for the first saved version, and would simply be incremented by one for each subsequent version of the file. This mechanism is effective in allowing each saved version of a file to be uniquely identified.

However, identifying a file by its version number is not always intuitive for a user, particularly if there are a large number of file versions. For instance, if a user desires to access the version of the file in which the term "patent" was first added to a word processing document file, the user is left to try to remember what version number corresponds to the time when the term "patent" was added. The user might not recollect whether it was version 132, 133, or whether it was some other version number. The user may be left to search through and even read portions of the various versions of the file, until the correct file version is found. This can be quite time-consuming for the user,

BRIEF SUMMARY OF THE INVENTION

The foregoing problems with the prior state of the art are overcome by the principles of the present invention, which are directed towards mechanisms for saving and accessing versions of files using indexed content, rather than a system version identifier. Thus, a user may identify a version of a file by its content (e.g., give me the last version of the file that contained the word "patent"), rather than using a less descriptive system-assigned version identifier such as "version 17" or "saved at 11:34:43 pm, Thursday, Sep. 25, 2005". Accordingly, the user is provided with a more intuitive and therefore efficient mechanism for identifying and accessing different versions of files.

Additional embodiments the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for saving and accessing versions of files using indexed content, rather than a system version identifier. First, a general computing system will be described with respect to FIG. 1, as being a suitable computing system that may be used to practice the principles of the present invention. Then, the principles of the present invention will be described with respect to FIGS. 2 through 4.

Figure 1:
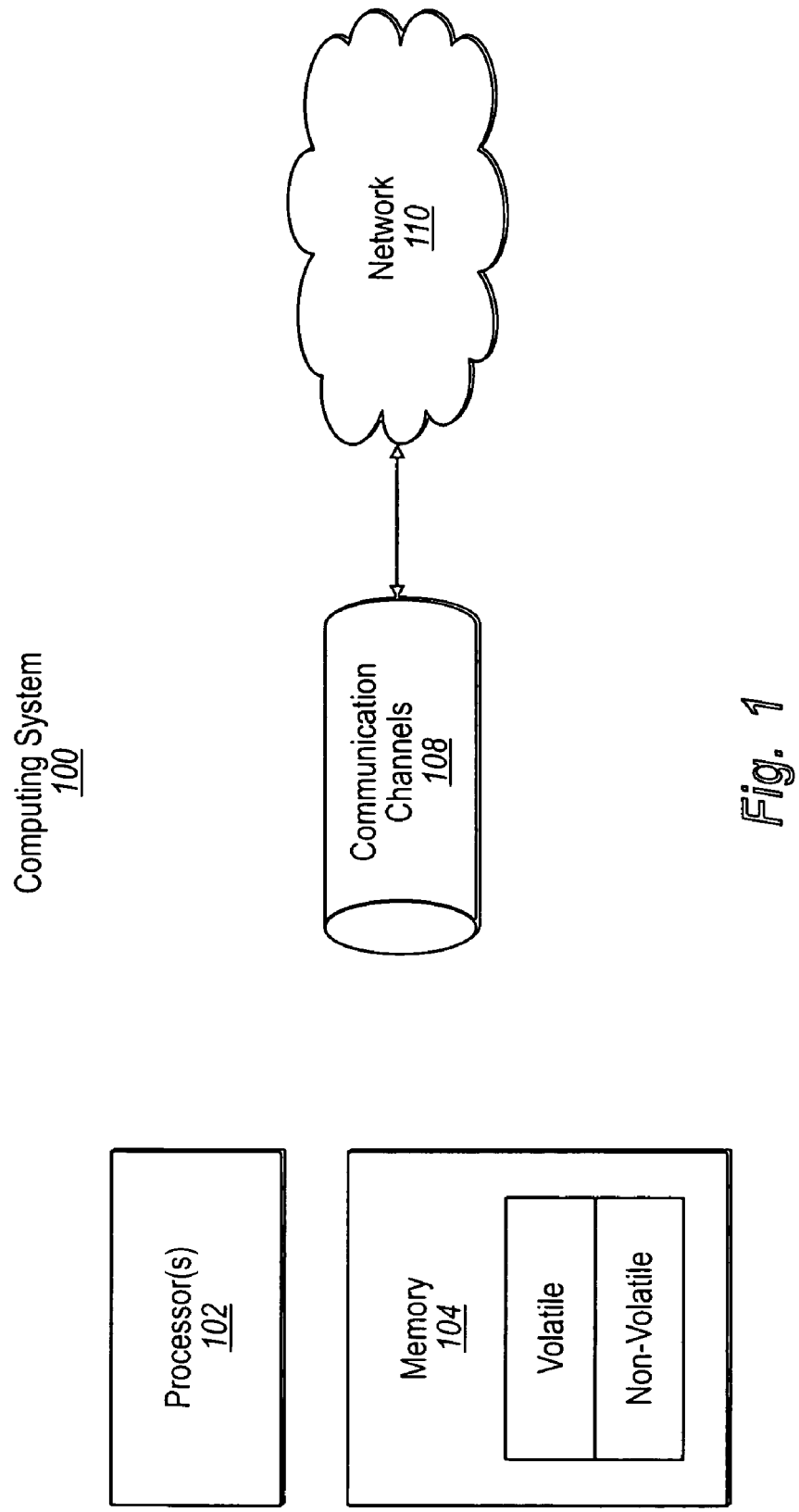
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
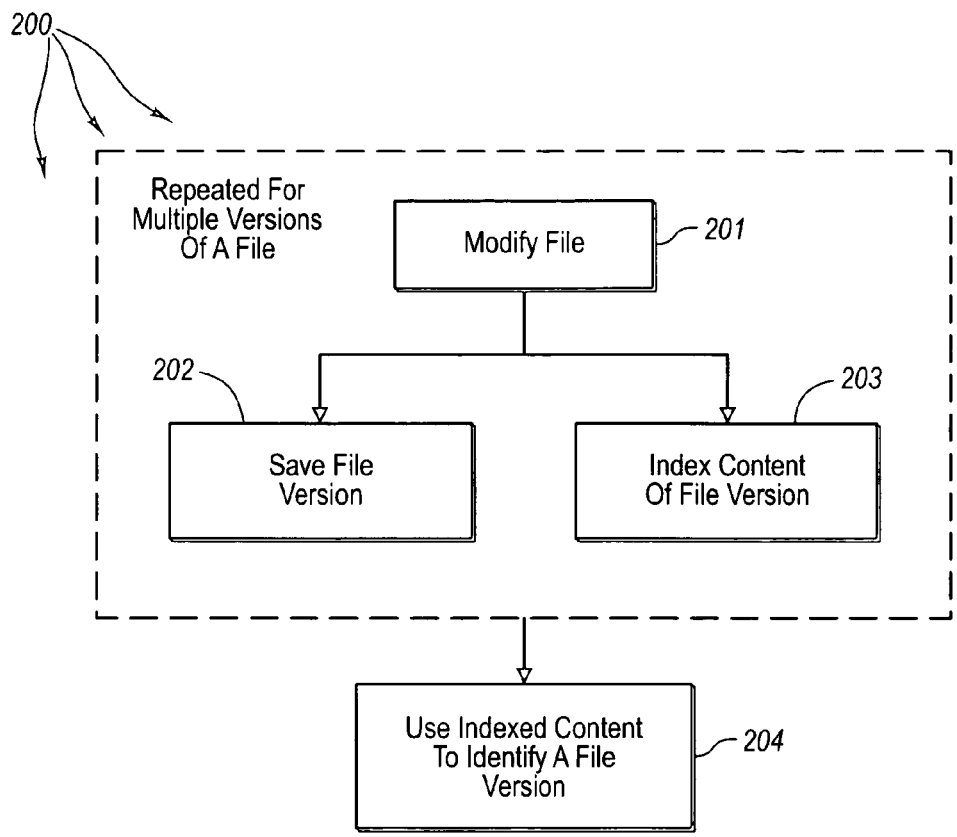
FIG. 2 illustrates a flowchart of a computer-implemented method for saving versions of a file in a manner that the version of the file is identified based on content of the file itself.

FIG. 2 illustrates a flowchart of a computer-implemented method 200 for saving versions of a file in a manner that the version of the file is identified based on content of the file itself. The computer-implemented method 200 may be implemented by, for example, computing system 100 of FIG. 1, although that is not required. Acts 201 through 203 of the method 200 may be repeated for multiple versions of a file each time the file is modified (act 201). For the first version of the file, the act of modifying the file (act 201) may simply involve creating the file. For subsequent versions of the file, the act of modifying the file (act 201) will result in the generation of subsequent versions of the file. Once the file is modified (act 201), the version of the file is saved (act 202), and content of that version is also indexed (act 203). The saving (act 202) and the indexing (act 203) are shown in parallel to emphasize that the saving may occur before, after, and/or during the indexing operation. At some subsequent time, however many versions of the file are saved and indexed, the indexed content of any one or more of the versions of the file may be used to identify a version of the file requested in subsequent requests for the file (act 204).

Figure 3:
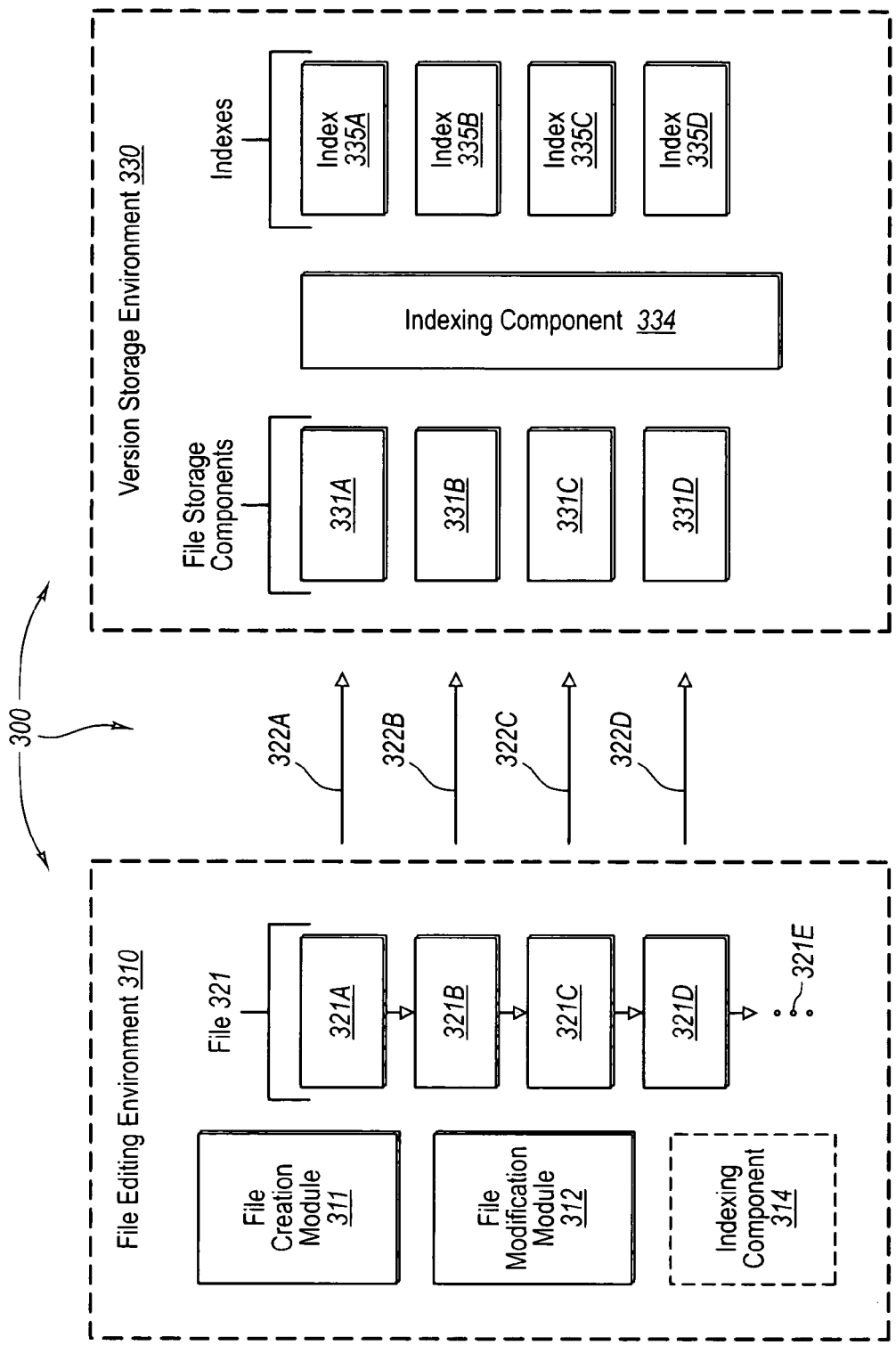
FIG. 3 shows an environment in which the principles of the present invention may be employed including a file editing environment for editing a file and a version storage environment for storing different versions of the file.

FIG. 2 will be described in further detail with reference to the example data flow of FIG. 3. FIG. 3 shows an environment 300 that includes a file editing environment 310 and a version storage environment 330. The file editing environment 310 includes a file creation module 311 that is capable of creating a file 321, illustrated in FIG. 3 as transitioning through multiple versions 321A, 321B, 321C, 321D amongst potentially many more as represented by the vertical ellipses 321E. The file editing environment 310 also includes a file modification module 312 that is capable of editing the file to thereby transition the file from one version to the next. The file creation and file modification modules 311 and 312 may be any combination of hardware and/or software, and may even be the same component. If implemented in software within the computing system 100 of FIG. 1, the file creation and modification modules 311 and 312 may be stored and/or instantiated in memory 104 for execution by processor(s) 102.

Referring to the combination of FIGS. 2 and 3, the file creation module 311 creates and optionally performs some initial processing on the file to generate a first version 321A of the file 321 (act 201). The first file version 321A is then saved as represented by arrow 322A (act 202). In FIG. 2, the first file version 321A is saved to the version storage environment 330 in the form of stored file components 331A. For the first version of the file, the file storage components 331A may contain the entire file, perhaps even in compressed and/or encrypted form.

The version storage environment 330 may include an indexing component 334 which serves to open the file, parse the file, and create an index 335A of portions of the stored file components 331A. For instance, if the file was a word processing document, the indexing component 334 may extract a searchable list of word occurrences and frequencies. Instead of the indexing occurring on the version storage environment 330, the file editing environment 310 may perform the indexing using, for example, indexing component 314, and the index may be saved along with the corresponding file version to the version storage environment 330.

As a side note, the file editing environment 310 and the version storage environment 330 may be in a single undistributed computing system. In this undistributed case, the saving operation may be a saving of the file version to a local storage device. On the other hand, the file editing environment 310 and the version storage environment 330 may be located on a distributed computing system on different network nodes, or perhaps on different computing systems communicating over a network. In that case, the saving of the file version would occur over a network. An example of such a network saving operation would be a file backup operation, in which case the file version is saved for potentially future recovery in case the primary active file becomes corrupted or otherwise lost.

Referring back to the combination of FIGS. 2 and 3, the file modification module 312 modifies the file 321 (act 201) to thereby transform the first file version 321A into a second file version 321B. For example, if the file 321 were a word processing document, the author may have added, modified, and/or deleted text in the document. The file editing environment 310 then saves the second file version 321B as represented by arrow 322B to generate file storage components 331B. The file storage components 331B represent any data that may be used either alone or in combination with prior stored file components (e.g., stored file components 331A) to reconstruct the second file version 321B. For instance, the file storage components 331B could be a full copy of the second version of the file (e.g., a base image in a backup environment).

Alternatively, the file storage components 331B may represent just incremental changes between the first file version and the second file version. For instance, in a snapshot backup environment, the stored file components 331B may be an incremental image of the file as of a particular point in time. In a continuous data protection environment, the stored file components 331B may be a write request journal entry.

Once again, if the indexing had not already been performed in the file editing environment 310, the indexing component 334 may index the stored file components 331B associated with the second file version 321B to generate index 335B. The indexing component 334 may index by reconstructing the entire second file version 321B, and then index components of that entire version. Alternatively, the indexing component may simply index changes. For instance, if the file 320 was a word processing document, the indexing component might generate an index 335 that represents, for example, that the word "patent" was added to a certain part of the document, or that the word "gingerly" was deleted from the document, or that the word "there" was changed to "their" at a certain part of the document. As a further alternative, the indexing component 334 indexes somewhat more than just the changes, but less than the entire file. For example, the indexing component 334 may index entire pages, paragraphs, or just sentences in which a change was made.

The file modification module 312 further modifies the file 321 (act 201) to thereby transform the second file version 321B into a third file version 321C. The file editing environment 310 then saves the third file version 321C (act 202) as represented by arrow 322C to generate file storage components 331C, which may then be indexed (act 203) to generate index 335C.

Repeating again, the file modification module 312 further modifies the file 321 (act 201) to thereby transform the third file version 321C into a fourth file version 321D. The file editing environment 310 then saves the fourth file version 321D as represented by arrow 322D to generate file storage components 331D, which may then be indexed (act 203) to create index 335D. This process may be repeated indefinitely for subsequent versions of the file as well as represented by the vertical ellipses 321E.

At some point, a user or perhaps another computer module or component may want to access a file version. It is sometimes non-intuitive for a user to identify a version of the file based on a version number or other metadata (e.g., creation date) than a file system associates with a file version. Instead, the principles of the present invention allow a user or other component to use the indexed content of the one or more of the various file versions to identify a particular desired version of the file.

Figure 4:
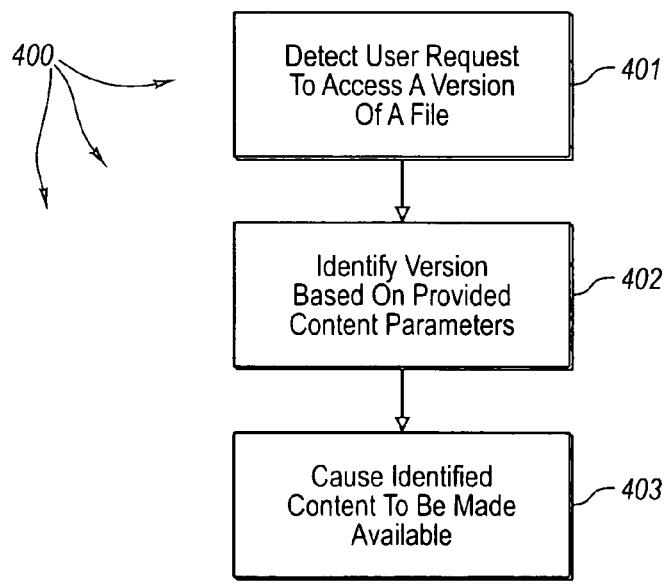
FIG. 4 illustrates a flowchart of a computer-implemented method for allowing a user to identify and access a selected one of multiple versions of a file without specifying a system version identifier.

For instance, FIG. 4 illustrates a flowchart of a computer-implemented method 400 for allowing a user to identify and access a selected one of multiple versions of a file without specifying a system version identifier (such as a version number or creation date). Upon detecting a user request from a user to access a version of a file that has multiple versions (act 401), the computing system automatically identifies the version of the file based on information about the content of the version of the file (act 402).

For example, the version request may specify that the desired version is the first version of a file that contains an added content item. For example, the request might be for the first version of the file that contains the words "patent" and "inventor". The version request might also be for the first version of a file that does not contain a deleted content item. For example, the request might be for the first version of the file after the words "application" was deleted or changed.

The identification of the file version may be used by comparing information about the content of the desired version with the indexed content of each file version. Once the file version is identified, the identified version of the file is then made accessible to the user (act 403). For instance, referring to FIG. 3, perhaps the file modification component 312 added the word "patent" to the file 320 (in this case, a word processing document), in order to generate the third file version 321C. The stored filed contents 331C would represent at least this addition, and the index 335C would represent the addition of the word "patent" to the document. Upon receiving a user-request for the first version of the file that contains the word "patent", the computing system would search through the index to find that the index 335C represented that the word "patent" was added, and that the indexes 335A and 335B contain no representation of the word "patent". The computing system would then identify the third version of the file as being the desired file, and would reconstruct the third version of the file in preparation for making the third version of the file accessible. This reconstruction may be made either solely based on the third file storage components 331C, but may also be made using stored file components 331A and 331B from prior file versions. The reconstruction may be made in the file editing environment 310, the version storage environment 330, or in some other environment. The third file version is then made accessible to the user through an appropriate user interface (e.g., a word processing user interface).

Accordingly, the computing system allows for a much more intuitive way for individuals to identify and access prior file versions. A user need not recollect a file version number, date of creation, or last-modified date that are less relevant to a user, and more relevant to the system. Instead, the user only is to recall the nature of what changes were made in that version, or some other representation of the unique contents of that version of the file, thereby providing a significant alternative to a user in how a file version is identified and accessed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for saving versions of a file in a manner that the version of the file is identified based on content of the file itself, the method comprising:

saving a first version of a file;

saving a second version of the file, the second version of the file comprising incremental changes from the first version of the file and
the incremental changes comprising a write-request journal entry
indexing content of the first version of the file;
indexing content of the second version of the file; and
using the indexed content of the first version of the file and the second version of the file to identify a version of the file based solely on the content of the version of the file, each of the one or more subsequent requests including an identification of one or more items of content of the version of the file
wherein indexing the content of the second version of the file comprises indexing at least a portion of the file as represented by the second version of the file.

2. The computer-implemented method of claim 1, wherein the second version of the file is a complete replacement of the first version of the file.

3. The computer-implemented method of claim 1, wherein the incremental changes comprise an incremental backup.

4. The computer-implemented method of claim 1, further comprising:
saving one or more subsequent versions of the file subsequent to the second version of the file;
indexing content of at least one of the one or more subsequent versions of the file; and
using at least the indexed content of the one or more subsequent versions of the file and the indexed content of the second version of the file to identify a version of the file requested in subsequent requests for the file, each of the subsequent including an identification of one or more items of content of the version of the file.

5. The computer-implemented method of claim 1, wherein saving the first version of a file comprises backing up the first version of the file to a backup storage medium.

6. The computer-implemented method of claim 1, wherein indexing content of the second version of the file comprises re-indexing the entire file as represented by the second version of the file.

7. The computer-implemented method of claim 1, wherein indexing content of the second version of the file comprises parsing the second version of the file.

8. The computer-implemented method of claim 1, wherein the second version of the file comprises one or more stored file components.

9. A computing system comprising:
one or more processors;
memory;
wherein the one or more processors execute computer-executable instructions to: save a first version of a file, save a second version of the file,
index content of the first version of the file,
index content of the second version of the file, and
use the indexed content of the first version of the file and the second version of the file to identify a version of the file requested in a subsequent request for the file based solely on the content of the version of the file,
the subsequent requests including an identification of content of the version of the file,
wherein the second version of the file comprises incremental changes from the first version of the file and
the incremental changes comprise a write request journal entry,
wherein the indexed content of the second version of the file comprises indexed content of at least a portion of the file as represented by the second version of the file.

10. The computing system of claim 9, wherein the second version of the file is a complete replacement of the first version of the file.

11. The computing system of claim 9, wherein the second version of the file represents an incremental backup from the first version of the file.

12. The computing system of claim 9, wherein the one or more processors execute the computer-readable instructions to save a third version of the file subsequent to the second version of the file, index content of the third version of the file, and use at least the indexed content of the third version of the file and the indexed content of the second version of the file to identify a version of the file requested in subsequent requests for the file, each of the subsequent requests including an identification of content of the version of the file.

13. The computer-implemented method of claim 9, wherein the index comprises a searchable list.

* * * * *